United States Patent
Van Pelt

(10) Patent No.: US 10,029,937 B2
(45) Date of Patent: Jul. 24, 2018

(54) PRINTER HEAD FOR 3D PRINTING

(71) Applicant: PHILIPS LIGHTING HOLDING B.V., Eindhoven (NL)

(72) Inventor: Willem Van Pelt, Winschoten (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 0 days.

(21) Appl. No.: 14/982,017

(22) Filed: Dec. 29, 2015

(65) Prior Publication Data
US 2016/0194233 A1 Jul. 7, 2016

(30) Foreign Application Priority Data
Jan. 6, 2015 (EP) .................................. 15150146

(51) Int. Cl.
| C03B 19/00 | (2006.01) |
| H05B 6/10 | (2006.01) |
| C03B 19/02 | (2006.01) |
| B29C 64/106 | (2017.01) |
| B33Y 30/00 | (2015.01) |
| B33Y 10/00 | (2015.01) |

(52) U.S. Cl.
CPC ............ C03B 19/00 (2013.01); B29C 64/106 (2017.08); C03B 19/02 (2013.01); H05B 6/10 (2013.01); *B29K 2909/08* (2013.01); *B33Y 10/00* (2014.12); *B33Y 30/00* (2014.12)

(58) Field of Classification Search
CPC .......... C03B 19/00; C03B 19/02; B33Y 10/00
See application file for complete search history.

(56) References Cited

U.S. PATENT DOCUMENTS

| 5,630,857 A | 5/1997 | Xu et al. |
| 6,129,872 A * | 10/2000 | Jang .................. B29C 41/36 264/245 |
| 2007/0178329 A1* | 8/2007 | Trommer ............. C03B 5/1675 428/586 |
| 2008/0282734 A1* | 11/2008 | Kolberg ................. C03B 5/021 65/32.2 |
| 2010/0283167 A1* | 11/2010 | Qi ........................ C03B 19/1015 264/8 |
| 2011/0281227 A1* | 11/2011 | Franz .................... C03B 5/0336 432/264 |
| 2012/0189729 A1 | 7/2012 | Pax |
| 2015/0166387 A1* | 6/2015 | Buckenauer ............. C03B 3/00 65/29.16 |

(Continued)

FOREIGN PATENT DOCUMENTS

| CN | 103395973 | 11/2013 |
| CN | 103551572 | 2/2014 |
| JP | H63295451 A | 12/1988 |

(Continued)

*Primary Examiner* — Jason L Lazorcik

(57) ABSTRACT

A printer head for 3D printing of glass and a method of 3D printing of glass is disclosed. In one embodiment, the printer head comprises a heating body made of a refractory metal, a through hole arranged in a central part of the heating body for feeding glass through the heating body, a nozzle arranged on the heating body at an outlet of the through hole, and an induction coil arranged around the heating body and to heat the heating body by way of electromagnetic induction if a HF voltage is applied across the induction coil.

14 Claims, 4 Drawing Sheets

(56) References Cited

U.S. PATENT DOCUMENTS

2015/0307385 A1* 10/2015 Klein .................. C03B 25/02
65/29.11

FOREIGN PATENT DOCUMENTS

| JP | H624785 A | 2/1994 |
| JP | 2004514634 A | 5/2004 |
| JP | 2012106918 A | 6/2012 |
| JP | 2015145327 A | 8/2015 |

\* cited by examiner

PRINTER HEAD FOR 3D PRINTING

CROSS REFERENCE TO RELATED APPLICATIONS

This application claims the benefit of European Patent Application Number 15150146.7 filed Jan. 6, 2015, which is incorporated herein by reference.

FIELD OF THE INVENTION

The invention relates to a printer head for 3D printing of glass and to a 3D printer comprising such a printer head. Furthermore, the invention relates to a 3D printing method for 3D printing of glass.

BACKGROUND 3D printing or additive manufacturing (AM) refers to any of the various processes for printing a three-dimensional object. Primarily additive processes are used, in which successive layers of material are laid down under computer control. These objects can be of almost any shape or geometry, and are produced from a 3D model or other electronic data source. Different types of 3D printers were developed over the years, such as 3D FDM (Fused Deposition Modeling) extrusion printers. 3D FDM extrusion printers are mostly based on melting a filament, e.g. plastics or metals, in a printer head. The maximum melting temperature of such 3D printers is limited to around 250° C. due to the relative low melting materials used for the printer heads.

There is a wish to be able to print glass objects, such as optical elements, with a 3D printer which requires a working temperature of the printer head of at least 200-2200° C.

Publication CN103395973 discloses a glass high temperature melting molding sprayer based on a 3D printing technology. The glass high temperature melting molding sprayer comprises a sprayer and a glass rod conveyor installed at the rear end of the sprayer. The sprayer comprises a protective shell, a high temperature resistant heat insulating insulation material layer, a high temperature electric heating wire layer, and a high temperature resistant corundum melting cavity that are sequentially connected. The sprayer is divided into three sections by the high temperature electric heating wire layer according to heating temperature. The three sections are a preheating warming section, an expansion softening section and a melting section. Each section is provided with a temperature sensor.

In publication CN103395973 the printing head comprises a heat wire which is enclosed by an insulation material layer to direct the most of the energy towards the corundum melting cavity at the center of the printing head. Such construction is not very energy efficient, and an unwanted amount of energy will be needed to reach the required temperatures. Furthermore, the use of refractory ceramics, such as corundum, will limit the maximum temperature of the printing head and therefore the printing of glass with a high viscosity like quartz glass or other glass types. A further problem with the use of refractory ceramics, such as corundum, for a high temperature 3D glass printing is the limited thermo shock resistance of most available ceramics and the chemical attack by glass causing impurities/bubbles in the molten glass.

SUMMARY

It is an object of the invention to provide a high temperature 3D printing head for printing glass wherein at least some of the problems of the state of the art mentioned above are overcome.

According to an aspect, there is provided a printer head for 3D printing of glass, the printer head comprising a heating body made of a refractory metal, a through hole arranged in a central part of the heating body for feeding glass through the heating body, a nozzle arranged on the heating body at an outlet of the through hole and an induction coil arranged around the heating body so as to heat the heating body by way of electromagnetic induction if a HF voltage is applied across the induction coil.

By feeding glass filaments through the through hole of the heating body which is heated by the induction coil, the filaments will melt and will leave the printer head in melted form as a glass ribbon. The glass ribbon will solidify soon after it is printed onto a printer table or an already printed layer placed on the printer table. It is noted that instead of feeding glass filament through the heating body, glass powder could be fed into the heating body.

The use of a refractory metal as construction material for the printer head, together with a HF heating system, allows the printer head to operate at temperatures above 1000° C. without concessions to the desired distance between orifice and a printer table. This enables 3D printing of glass with a high viscosity like quartz glass or other glass types.

Optionally, the refractory metal comprises at least one of the following: Molybdenum, Tungsten and Rhenium. These metals combine a relatively high melting point with a degree of machinability of the material needed to create a printer head.

Optionally, the heating body is substantially cylindrical shaped. Such substantially cylindrical shaped can easily be placed into a cavity of a cylindrical shaped induction coil. Furthermore, in a substantially cylindrical shaped body, the created heat can be evenly distributed across the body which will enable easy temperature control.

The through hole, also referred to as the channel, may be co-axially arranged relative to a main axis of the heating body. This results in a very simple and robust design.

Optionally, the induction coil is co-axially arranged relative to a main axis of the heating body. In this configuration, the created eddy currents will flow around the main axis, and an optimal amount of heat is created in an efficient way.

Optionally, the induction coil is arranged at a distance from an outer surface of the heating body. If the induction coil is arranged at a distance from the heating body, the risk of unwanted physical (and electrical) contact is minimized. So the coil will not heat up itself. Furthermore, it is easy to place a new printer head inside the coil if the printer head needs to be replaced by another one.

Optionally, the heating body comprises one or more grooves at an outer surface of the heating body. The heating of a metal body in a HF field may lead to an uneven temperature distribution, wherein the outside of the heating body reaches a higher temperature due to the tendency of eddy currents to concentrate at the outside of a metal conductor. To eliminate these temperature differences, concentration grooves may be provided. Preferably the grooves are axially milled in the printer head body to force the eddy currents to the inside of the body. The application of energy concentration grooves in the body of the printer head will improve the temperature distribution curve in the printer head.

Optionally, the printer head comprises one or more gas supply channels, outputs of which being arranged at the vicinity of the nozzle of the printer head. Through these supply channels protective gasses such as Nitrogen can be provided to create a protective environment around the nozzle and/or the heating body which are made of a refractive metal. The resistance of these metals against the attack of water and oxygen at high temperatures is very limited and may lead to an oxidation of the surface under the forming of volatile metal oxides. So protecting the surface of the metal component will increase the lifetime of the printer head.

According to a further aspect, there is provided a printer comprising a printer head as described above.

Optionally, the printer comprises a gas supply for supplying a protective gas to a surrounding of the printer head, and an envelope arranged around the printer head in order to contain the protective gas so as to create a protective gas atmosphere. The protective gas may be selected from the group of Nitrogen and Argon. Such gasses have shown that they considerably protect the surface of the heating body and nozzle.

According to a further aspect, there is provided a 3D printing method for 3D printing of glass. The method comprises the providing of a printer head comprising a heating body made of a refractory metal and having a through hole arranged in a central part of the heating body. The method further comprises arranging an induction coil around the heating body and feeding one or more glass filaments through the through hole, and applying a HF voltage across the induction coil so as to heat the heating body by way of electromagnetic induction and indirectly heat the glass filaments.

A working temperature of the printer head may lie between 200-2200° C. These temperatures make 3D printing possible of materials like borosilicate, quartz glass, low melting solder glasses, soda lime glasses, E-glasses, bio-glasses or other glass with a high softening point.

The invention proposes a High Frequency (HF) heated 3D printer head made of a refractory metal. Optionally, energy concentration grooves are arranged in the heating body and supply channels for supplying a cooling or protecting gas around the nozzle.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Figure 1:
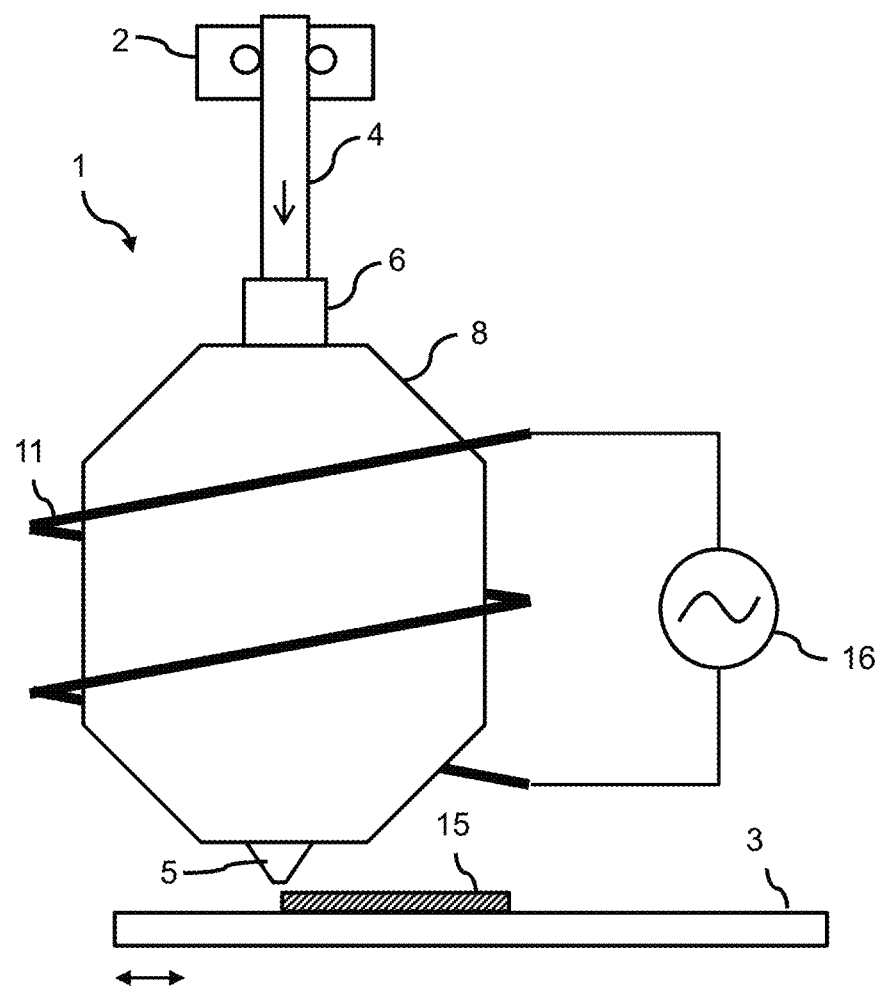
FIG. 1 schematically shows a side view of some components of a 3D printer according to an embodiment of the invention.

FIG. 1 schematically shows a side view of some components of a 3D printer according to an embodiment of the invention. The 3D printer comprises a printer head 1, an input unit 2 and a table 3, also referred to as XY(Z) table 3. The input unit 2 is arranged to press a glass filament 4 into the cold end of the printer head 1 by means of a stepping motor. It is noted that other types of feeding glass filaments into the printer head 1 may be possible. In this example, the printer head 1 comprises a nozzle 5, a transport tube 6 and a heating body 8. The heating body 8 is made of a so-called refractory metal. The transport tube 6 extends through a hole (not shown in FIG. 1) present in a central part of the heating body 8. An induction coil 11 is arranged around the heating body 8 at a distance from an outer surface of the heating body 8. The induction coil 11 is connected to a HF (high frequency) voltage supply 16. Once the HF voltage supply 16 is activated, a HF current through the coil 11 will create an electromagnetic field which will create so-called Eddy currents in the heating body 8 and as a result the heating body 8 will increase in temperature. By applying a sufficient voltage across the coil, the heating body 8 will reach a temperature at which glass filament passing through the printer head 1 will melt. The melted glass will leave the printer head 1 at the nozzle 5 as a ribbon where it meets the table 3 or already fabricated layers on the XY(Z) table 3. The XY(Z) table 1 may be moved by positioning means (not shown) which are controlled by a computer program. The table 3 will steer the ribbon in the right direction based on the output of the computer program. By steering the stepping motor of the input unit 2, the deposition of the wanted amount of material on the right spot of a printed object 15 is achieved.

Figure 2:
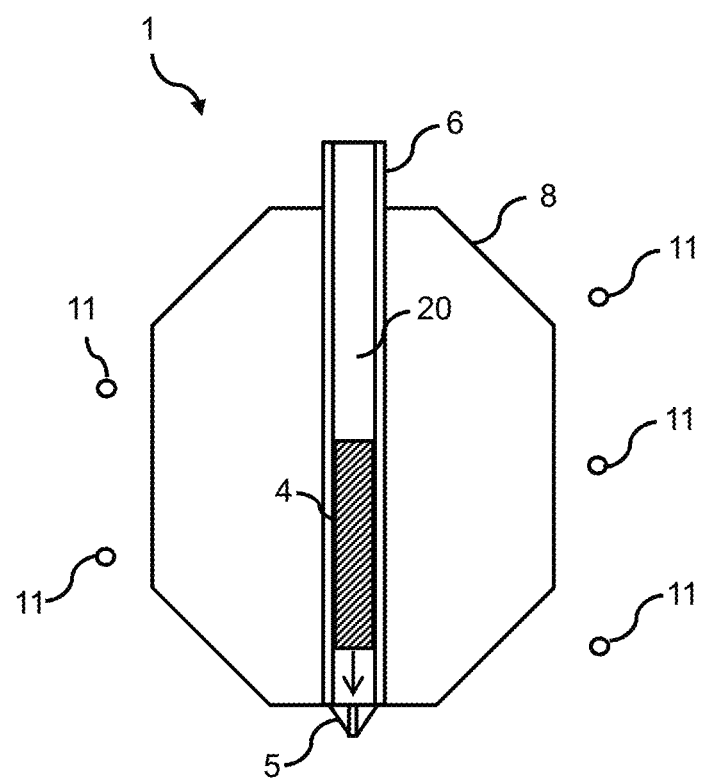
FIG. 2 schematically shows a cross section of the printer head of FIG. 1.

FIG. 2 schematically shows a cross section of the printer head 1 of FIG. 1.

In this embodiment the transport tube 6 extends through a hole of the printer head 1 right until the nozzle 5. It is noted that other solutions are possible, wherein the transport tube 6 is connected to the through hole of the heating body 8 at the inlet side. As mentioned above, the printer head 1 is heated by the induction coil 11. The induction coil 11 creates a hot end zone in the printer head 1. It is noted that in FIG. 2 the coil 11 comprises two windings. The number of windings may vary from one winding to a plurality. The windings may all be positioned at a lower end of the printer head 1 so as to focus on the lower part (i.e. hot end) of the heating body 8.

In FIG. 2, the glass filament 4 is pressed into the hot zone of the printer head 1 by those filaments (not shown) downstream the glass filament 4. In the hot end zone the glass material is melting. The melted glass material is further forced to move through the nozzle 5 and will create a ribbon outside the printer head 1 with a certain diameter determined by a cross section of an orifice of the nozzle 5.

The use of a refractory metal as construction material for the printer head, together with a HF heating system, allows the printer head 1 to operate at temperatures above 200° C. without concessions to the desired distance between orifice of the nozzle 5 and a printer table 3. This makes 3D printing possible of materials like borosilicate, quartz glass, low melting solder glasses, soda lime glasses, E-glasses, bio-glasses or other glass with a high softening point. Working with temperature between e.g. 200-2200° C. of the printer head 1 will enable creating melted materials with desired viscosity to create a ribbon with the right dimensions. Especially at these high temperatures the use of refractory ceramics as construction material for the printer head is not possible due to the limited thermo shock resistance of most available ceramics. The chemical attack of most ceramics by glass at high temperature causes the forming of impurities and bubbles in the molten glass ribbon. This is a second reason to disqualify ceramic materials as construction material for the printer head.

In an embodiment the heating body of the printer head 1 is made out of Molybdenum, Tungsten or Rhenium. These three preferred metals combine their high melting point with the degree of machinability of the material needed to create a printer head.

Figure 3:
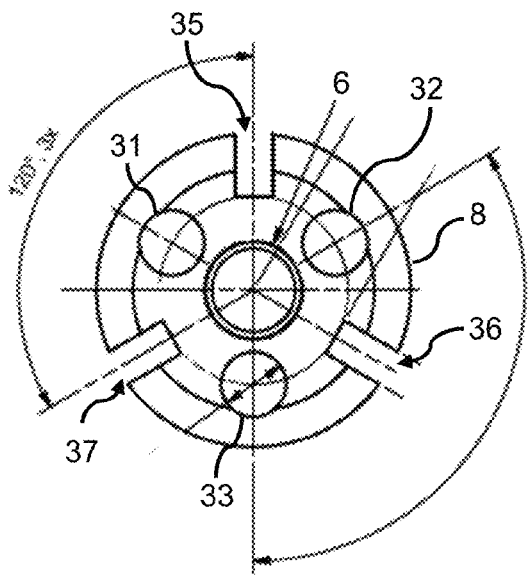
FIG. 3 shows a cross section of the heating body according to a specific embodiment.

It has shown that the resistance of the three metals against the attack of water and oxygen at high temperatures is limited and may lead to oxidation of the surface under the forming of volatile metal oxides. For that reason a protective gas atmosphere may be created around the printer head 1 during printing. In an embodiment the printer head 1 comprises one or more gas supply channels, outputs of which are arranged at the vicinity of the nozzle 5 of the printer head 1. The supply channels may be incorporated in the heating body 8. FIG. 3 shows a cross section of the heating body 8 according to a specific embodiment. In this embodiment, the heating body 8 has a substantially circular cross section. As is shown in FIG. 3, three channels 31, 32, 33 are arranged in the heating body 8. Furthermore, energy concentration grooves 35, 36, 37 are axially arranged in the heating body 8 the function of which will be explained later on.

Figure 4:
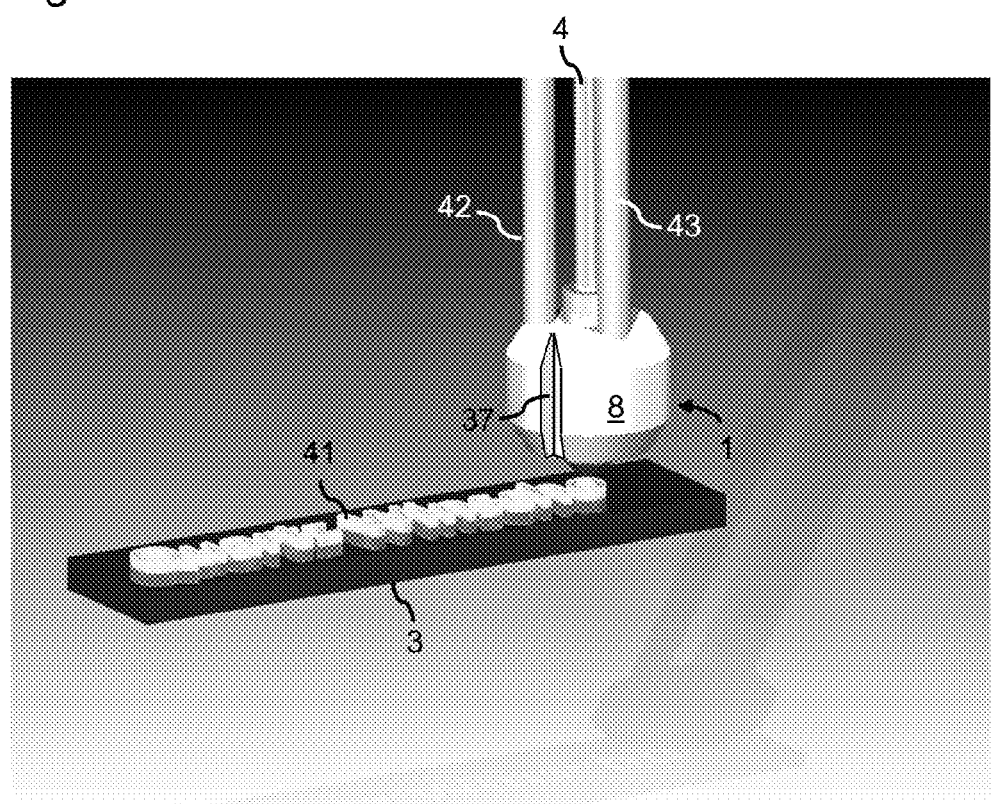
FIG. 4 shows a perspective view of an embodiment of a 3D printer comprising the printer head of FIG. 3 and a XY(Z) table.

FIG. 4 shows a perspective view of an embodiment of a 3D printer comprising the printer head 1 of FIG. 3 and a XY(Z) table 3. The XY(Z) table 3 is positioned under the printer head 1 which is static. It is noted that instead of only moving the XY(Z) table 3, also the printer head 1 may be moved during printing, or only the printer head 1 and not the XY(Z) table 3. FIG. 4 shows a printed object 41 which in this particular example is a sequence of characters.

The 3D printer of FIG. 4 comprises three gas supply tubes, two of which are visible in FIG. 4, see gas supply tubes 42, 43. A third gas supply tube is hidden behind the glass filament 4 entering the printer head. The gas supply tubes 42, 43 extend through the heating body of the printer head 1 and their outlets are arranged at the bottom of the heating body 8 near the nozzle (not visible in FIG. 4). The gas supply tubes 42, 43 may be manufactured out of the same refractory metal as the metal used for the heating body 8.

During printing a protective gas atmosphere is created by supplying a protective gas, such as Nitrogen or Argon, through the gas supply tubes 42, 43. Alternatively, the tubes may supply a cooling gas in order to cool the surrounding of the nozzle.

To better control the gas atmosphere, the printer head 1 and the table 3 may be placed in an envelope (not shown) arranged around the printer head 1 in order to contain the protective gas.

In the embodiment of FIG. 4, the metal tubes 42, 43 for the supply of protective or cooling gas may also serve to fix the printer head 1 on the right place in the HF coil (not shown in FIG. 4). In an embodiment the HF coil 11 is not in contact with the heating body 8 but is spaced away so as to avoid electrical contact with the metal heating body 8. A 3D printer may comprise different types of HF coils in which different sizes or types of printer heads can be placed. This enables simple design of the 3D printer in which the HF coil 11 stays mounted while the printer head 1 can be replaced by another one more suitable for a specific task. Also the HF coils could be replaced if a better fit with a new printer head is needed.

As mentioned above, the very small distance between the nozzle 5 and the printed object 15, 41 needs a special approach of the heating equipment of the printer head 1. This is done by using the HF voltage supply 16 powering the HF coil 11 for the inductive heating of the printer heating body 8. This makes it possible to avoid the need for insulation material in the printer head as used in prior art technologies.

The metal heating body 8 may be a substantially cylindrical body (see FIG. 1) having a main axis of symmetry and may comprise a number of co-axial through holes to receive the transport tube and/or the gas supply tubes. Heating of such a cylindrical metal heating body 8 in a HF electromagnetic field may lead to an unequal temperature distribution inside the heating body. The outside of the heating body 8 may reach a much higher temperature due to the tendency of eddy currents to concentrate at the outside of the metal conductor. To eliminate the undesirable temperature difference, between outside and inside of the body, energy concentration grooves, such as the grooves 35, 36, 37, may be axially milled in the printer heating body 8 to force the eddy currents to the inside. In the embodiment of FIG. 3, three grooves are arranged in the heating body 8. It is noted that more or less grooves may be used. Preferably, the grooves are evenly distributed around the main axis of the heating body 8. Different shapes and sizes/dimensions are possible depending on the size of the heating body 8.

In an embodiment, the HF coil 11 is arranged around a lower and mid part of the heating body 8. By heating those parts of the printer head 1 a cold end and a hot end zone can be created for the proper input and flow of the filament 4 through the printer head 1. A temperature gradient between these two zones determines the end result. Using a HF coil which is adapted to the size of the printer head creates a sharp temperature gradient at the top of the printer head 1 where the temperature at the input is well below the glass melting temperature and allows a filament input without any support tube to minimize the risk of jamming in the input area.

Figure 5:
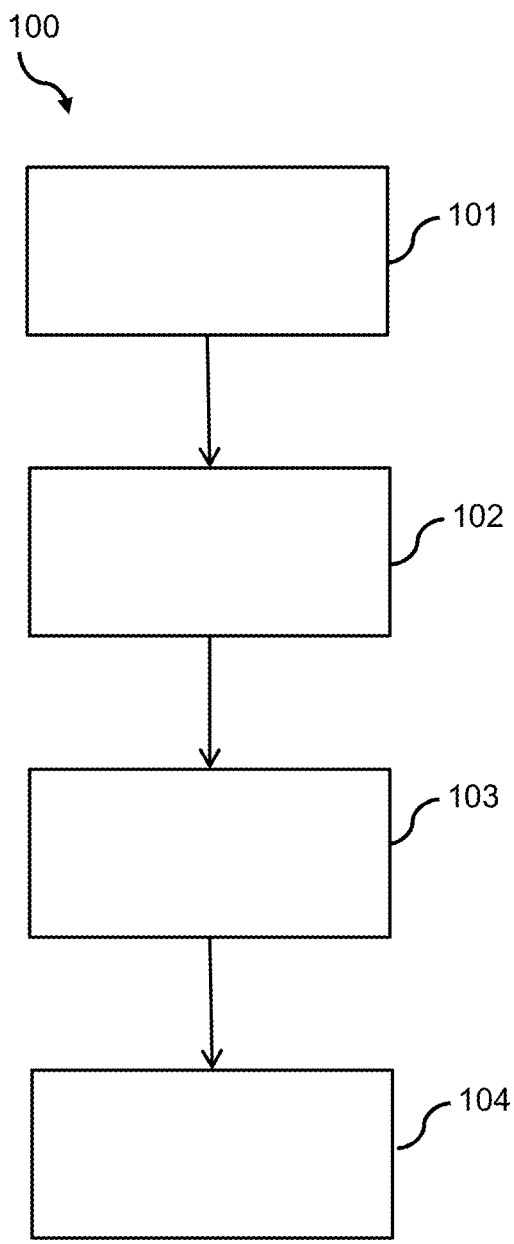
FIG. 5 shows a flow chart of a 3D printing method for 3D printing of glass according to an embodiment of the invention.

FIG. 5 shows a flow chart of a 3D printing method for 3D printing of glass according to an embodiment of the invention. The method comprises the providing of a printer head, see step 101, comprising a heating body made of a refractory metal and having a through hole arranged in a central part of the heating body. An induction coil is arranged around the heating body, see step 102. In a further step 103, one or more glass filaments are fed through the through hole. A HF voltage is applied across the induction coil so as to heat the heating body by way of electromagnetic induction and indirectly heat the glass filaments, see step 104. It is noted that the steps 101, 102, 103 and 104 are not necessarily consecutive steps and that some or all of them may be executed at the same time.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims. Further, the invention is not limited to the embodiments, and the invention lies in each and every novel feature or combination of features described above or recited in mutually different dependent claims.

The invention claimed is:

1. A printer head for 3D printing of glass, the printer head comprising:

a heating body made of a refractory metal, the heating body having an outer surface;

a through hole arranged in a central part of the heating body for feeding glass through the heating body;

a nozzle arranged on the heating body at an outlet of the through hole;

an induction coil arranged around the outer surface of the heating body to heat the heating body by way of electromagnetic induction if a HF voltage is applied across the induction coil; and, a groove within the outer surface of the heating body configured to force eddy currents to an inside of the heating body.

2. The printer head according to claim 1, wherein the refractory metal comprises at least one of the following: Molybdenum, Tungsten and Rhenium.

3. The printer head according to claim 1, wherein the heating body is substantially cylindrical shaped.

4. The printer head according to claim 1, wherein the through hole is co-axially arranged relative to a main axis of the heating body.

5. The printer head according to claim 1, wherein the induction coil is co-axially arranged relative to a main axis of the heating body.

6. The printer head according to claim 1, wherein the induction coil is arranged at a distance from an outer surface of the heating body.

7. The printer head according to claim 1, wherein the induction coil is co-axially arranged around the heating body.

8. The printer head according to claim 1, wherein the heating body comprises two or more grooves at an outer surface of the heating body.

9. The printer head according to claim 1, wherein the printer head comprises one or more gas supply channels, outputs of which being arranged at the vicinity of the nozzle of the printer head.

10. A 3D printer comprising a printer head according to claim 1.

11. The 3D printer according to claim 10, the printer comprising: a gas supply for supplying a protective gas to a surrounding of the printer head; an envelope arranged around the printer head in order to contain the protective gas so as to create a protective gas atmosphere.

12. The 3D printer according to claim 11, the protective gas being selected from the group of Nitrogen and Argon.

13. The printer head according to claim 1, wherein the groove is arranged between an outside of the heating body and the inside of the heating body.

14. The printer head according to claim 1, wherein the groove extends from a first portion of the heating body proximate to an input for feeding glass through the heating body to a second portion of the heating body proximate to an output for feeding glass through the heating body.

* * * * *